United States Patent
Lee et al.

(10) Patent No.: US 9,604,308 B2
(45) Date of Patent: Mar. 28, 2017

(54) METHOD FOR MANUFACTURING RECTANGULAR PIECES WITH HIGH CUTTING EFFICIENCY

(71) Applicant: LG CHEM, LTD., Seoul (KR)

(72) Inventors: Ho Kyung Lee, Daejeon (KR); Kyu Hwang Lee, Daejeon (KR); Joo-Sang Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/650,526

(22) PCT Filed: Feb. 20, 2014

(86) PCT No.: PCT/KR2014/001358
§ 371 (c)(1),
(2) Date: Jun. 8, 2015

(87) PCT Pub. No.: WO2014/129807
PCT Pub. Date: Aug. 28, 2014

(65) Prior Publication Data
US 2015/0352663 A1    Dec. 10, 2015

(30) Foreign Application Priority Data

Feb. 20, 2013  (KR) .................. 10-2013-0017853

(51) Int. Cl.
*G02B 7/00* (2006.01)
*G02B 27/00* (2006.01)
(Continued)

(52) U.S. Cl.
CPC ............ *B23K 26/0021* (2013.01); *B26F 1/38* (2013.01); *B26F 3/004* (2013.01); *G02B 1/12* (2013.01); *Y10T 83/0586* (2015.04)

(58) Field of Classification Search
CPC ..... G02B 1/12; Y10T 83/0586; Y10T 83/929; Y10T 83/0405; Y10T 83/05;
(Continued)

(56) References Cited

U.S. PATENT DOCUMENTS 2,617,329 A * 11/1952 Dreyer ................. G02B 27/281
160/166.1
5,080,297 A    1/1992 Blaimschein
(Continued)

FOREIGN PATENT DOCUMENTS

CN    1947041 A    4/2007
CN    101743352 A    6/2010
(Continued)

*Primary Examiner* — Jade R Chwasz
(74) *Attorney, Agent, or Firm* — Dentons US LLP

(57) ABSTRACT

Disclosed herein is a method of manufacturing two kinds of rectangular unit pieces having different optical properties from a base material sheet through cutting using a cutting frame including a cutter, the method including preparing a base material sheet having a large length to width ratio, the base material sheet exhibiting optical directivity in a longitudinal direction or in a lateral direction, preparing a cutting frame including at least on first cutter for cutting a first unit piece exhibiting optical directivity parallel to that of the base material sheet and at least one second cutter for cutting a second unit piece exhibiting optical directivity perpendicular to that of the base material sheet, the first cutter and the second cutter being arranged adjacent to each other in the lateral direction of the base material sheet, and sequentially cutting the base material sheet using the cutting frame in the longitudinal direction of the base material sheet to simultaneously manufacture the first unit piece and the second unit piece.

11 Claims, 6 Drawing Sheets

(51) Int. Cl.
*B23K 26/00* (2014.01)
*B26F 1/38* (2006.01)
*G02B 1/12* (2006.01)
*B26F 3/00* (2006.01)

(58) Field of Classification Search
CPC ............. Y10T 83/0524; Y10T 83/7684; Y10T 83/8812; Y10T 83/8822; Y10T 83/9493; Y10T 156/1052; Y10T 428/24306; Y10T 428/24314; Y10T 83/6875; Y10T 83/7697; Y10T 83/7763; Y10T 83/9476; B26F 1/38; B26F 3/004; B26F 1/44; B26F 2001/4481; B26F 1/14; B26F 1/3853; B26D 1/0006; B26D 2001/0053; B26D 2001/006; B26D 7/00; B26D 2001/0033; B26D 7/0006; B26D 9/00; B26D 5/00
USPC .................................................. 359/894, 900
See application file for complete search history.

(56) References Cited

U.S. PATENT DOCUMENTS 5,096,520 A * 3/1992 Faris ..................... G02B 27/283
    156/99
2010/0236371 A1* 9/2010 Lee ........................ B23K 26/38
    83/651

FOREIGN PATENT DOCUMENTS

| JP | 2005-246397 A | 9/2005 |
| JP | 2006-201449 A | 8/2006 |
| JP | 2010-533600 A | 10/2010 |
| JP | 2013-003617 A | 1/2013 |
| JP | 2003-343792 A | 12/2013 |
| KR | 10-2007-0011257 A | 1/2007 |
| KR | 10-2009-0008088 A | 1/2009 |
| WO | 2010-118746 A1 | 10/2010 |

* cited by examiner

METHOD FOR MANUFACTURING RECTANGULAR PIECES WITH HIGH CUTTING EFFICIENCY

This application is a National Stage Entry of International Application No. PCT/KR2014/001358, filed on Feb. 20, 2014, and claims the benefit of Korean Application No. 10-2013-0017853, filed on Feb. 20, 2013, all of which are hereby incorporated by reference in their entirety

TECHNICAL FIELD

The present invention relates to a method of manufacturing two kinds of rectangular unit pieces having different optical properties from a base material sheet through cutting using a cutting frame including a cutter.

BACKGROUND ART

A technology for cutting a long base material sheet to manufacture a plurality of rectangular unit pieces having a relatively small size has been adopted in various fields. For example, a base material sheet having a specific width and a long length is repeatedly cut by a cutting frame to simultaneously manufacture a plurality of rectangular unit pieces though a one-time cutting process.

Meanwhile, the size (width) of the base material sheet is specified, whereas the size of the rectangular unit pieces may vary as needed, due to various factors, such as the limitation of base material sheet suppliers, the efficiency aspect of the manufacturing process, the fluctuation in demand of rectangular unit pieces, etc. At this time, the cutting efficiency greatly varies depending upon how the cutting process is carried out. The low cutting efficiency increases the amount of scrap, produced from the base material sheet, which will be disposed of after the cutting process with the result that, eventually, the manufacturing costs of the rectangular unit pieces increase.

In a case in which the size (width and length) of a base material sheet is in constant proportion to the size (length and width) of rectangular unit pieces, it is possible to minimize the cutting loss by sequentially arranging the rectangular unit pieces such that the rectangular unit pieces are brought into contact with one another at positions having such constant proportion. In a case in which such constant proportion is not formed, however, the cutting loss may vary depending upon the array structure of the rectangular unit pieces. Furthermore, when the rectangular unit pieces are to be cut while the array of the rectangular unit pieces is changed according to optical directivity of the base material sheet, a large amount of scrap is inevitably produced.

When cutting base material sheet to manufacture a plurality of desired rectangular unit pieces based on the size of the base material sheet, therefore, a method of increasing the cutting rate of the base material sheet is very important in the aspect related to the manufacturing costs of the rectangular unit pieces.

The cutting rate of the base material sheet may vary typically depending upon the condition of the cutting process, the structure of the cutting frame, etc. That is, it is possible to achieve high cutting efficiency through the working condition to maximize the utilization of the base material sheet in the cutting process, the array structure in which cutters for cutting base material sheet to manufacture rectangular unit pieces are optimally arranged on the base material sheet, etc.

In order to cut the base material sheet according to optical directivity of the base material sheet to manufacture rectangular unit pieces, there is generally used an array structure in which the cutters (for example, knives) are arranged on the cutting frame such that the rectangular unit pieces corresponding to the cutters are adjacent to one another.

In connection with this respect, FIGS. 2 and 3 are partial typical views showing the array structure of rectangular unit pieces corresponding to cutters of a conventional cutting frame. In addition, FIG. 1 is a typical view showing that rectangular unit pieces, manufactured using the conventional cutting frame, are applied to a real product. For the convenience of description, a base material sheet is illustrated to have a predetermined length.

Referring to FIGS. 2 and 3 together with FIG. 1, unit piece A 20 cut in a direction parallel to optical directivity 25 and unit piece B 30 cut in a direction perpendicular to optical directivity 35 are arranged such that the optical directivity 25 and the optical directivity 35 are perpendicular to each other when the unit piece A 20 and the unit piece B 30 are applied to a product. Consequently, the rectangular unit pieces 20 and 30 are arranged according to optical directivity 15 of base material sheets 150 and 160.

Referring to FIG. 2, the rectangular unit pieces 20 are arranged on the base material sheet 150 to manufacture unit pieces A 20 having optical directivity 25 parallel to the optical directivity 15 of the base material sheet 150. Since the width W of the base material sheet 150 is not in constant proportion to the width of the rectangular unit pieces 20, however, cutting loss equivalent to the remaining portion (W3×L0) after cutting occurs.

Referring to FIG. 3, the rectangular unit pieces 30 are arranged on the base material sheet 150 to manufacture unit pieces B 30 having optical directivity 35 perpendicular to the optical directivity 15 of the base material sheet 160. Since the width W of the base material sheet 160 is not in constant proportion to the length of the rectangular unit pieces 30, however, cutting loss equivalent to the remaining portion (W4×L0) after cutting occurs.

Furthermore, two or more kinds of rectangular unit pieces having different optical directivities are manufactured from base material sheets having different constituents according to the optical directivities. For this reason, different kinds of rectangular unit pieces cannot be arranged on the same base material sheet to utilize the remaining portion after cutting.

Therefore, an array structure of unit pieces having higher cutting efficiency than the array structures of the unit pieces shown in FIGS. 2 and 2 and a manufacturing method based thereupon will reduce cutting loss and thus lower manufacturing costs of products. Improvement of cutting efficiency is more serious when base material sheets are expensive and/or rectangular unit pieces are mass-produced.

DISCLOSURE

Technical Problem

Therefore, the present invention has been made to solve the above problems and other technical problems that have yet to be resolved.

Specifically, it is an object of the present invention to provide a method of manufacturing rectangular unit using a cutting frame configured such that a first cutter for cutting a first unit piece having optical directivity parallel to that of a base material sheet and a second cutter for cutting a second unit piece having optical directivity perpendicular to that of the base material sheet are mounted in the cutting frame, thereby achieving high cutting efficiency.

It is another object of the present invention to provide a method of manufacturing rectangular unit pieces based on the array structure of the unit pieces having high cutting efficiency as described above, thereby reducing cutting loss and thus lowering manufacturing costs of products.

Technical Solution

In accordance with one aspect of the present invention, the above and other objects can be accomplished by the provision of a method of manufacturing two kinds of rectangular unit pieces having different optical properties from a base material sheet through cutting using a cutting frame including a cutter, the method including preparing a base material sheet having a large length to width ratio, the base material sheet exhibiting optical directivity in a longitudinal direction or in a lateral direction, preparing a cutting frame including at least on first cutter for cutting a first unit piece exhibiting optical directivity parallel to that of the base material sheet and at least one second cutter for cutting a second unit piece exhibiting optical directivity perpendicular to that of the base material sheet, the first cutter and the second cutter being arranged adjacent to each other in the lateral direction of the base material sheet, and sequentially cutting the base material sheet using the cutting frame in the longitudinal direction of the base material sheet to simultaneously manufacture the first unit piece and the second unit piece.

In the method of manufacturing the rectangular unit pieces according to the present invention as described above, the first cutter and the second cutter are mounted in the cutting frame to manufacture the first unit piece and the second unit piece exhibiting different optical directivities and the first unit piece and the second unit piece are manufactured from the same base material sheet. Consequently, it is possible to improve cutting efficiency. In addition, it is possible to continuously perform the operation through a series of steps as defined above, thereby lowering manufacturing costs of the rectangular unit pieces.

In the conventional manufacturing method as previously described, rectangular unit pieces having different optical directivities are manufactured from base material sheets having different constituents according to the optical directivities. For this reason, different kinds of rectangular unit pieces cannot be arranged on the same base material sheet to utilize the remaining portion after cutting.

In the manufacturing method according to the present invention, on the other hand, constituents of base material sheets having different optical directivities are unified, whereby it is possible to cut two kinds of rectangular unit pieces having different optical directivities from the same base material sheet. Consequently, it is possible to provide a method of manufacturing rectangular unit pieces based on the array structure of the unit pieces having high cutting efficiency as described above, thereby reducing cutting loss and thus lowering manufacturing costs of products.

The base material sheet may be a sheet comprising a layer for absorbing or transmitting only a specific-direction wave motion of light or an electromagnetic wave in the longitudinal direction or in the lateral direction. In addition, each of the rectangular unit pieces, cut from the base material sheet, may be a relatively small-sized film of which the absorption layer or the transmission layer has optical directivity parallel to or perpendicular to that of the base material sheet.

Furthermore, the base material sheet may be, for example, a laminate sheet configured to have a structure in which a sheet, as a protective layer, is attached to one side or opposite sides of another sheet including an absorption layer or a transmission layer. According to circumstances, an additional layer or sheet for improving physical properties or adding a function may be added in addition to the above-described layers.

In addition, the laminate sheet may be manufactured by coupling separately manufactured unit sheets by adhesive or thermal welding. According to circumstances, the laminate sheet may be manufactured by co-extrusion.

The rectangular unit pieces cut using the above cutting method, i.e. the first unit piece and the second unit piece having different optical directivities, may be applied to a product as a pair. Consequently, a pair of first and second unit pieces may have the same length and width when the first unit piece and the second unit piece are arranged such that the optical directivities of the first unit piece and the second unit piece are perpendicular to each other.

Meanwhile, the kind of the cutters, formed or mounted in the cutting frame, is not particularly restricted so long as the cutters exhibit the structure or properties to cut the rectangular unit pieces from the base material sheet. For example, each cutter may be a knife for cutting, such as a metal knife or a jet water knife, or a light source for cutting, such as laser.

In the present invention, knife for cutting may be mounted or formed in the cutting frame while having a shape corresponding to each rectangular unit piece.

Specifically, the array structure of the rectangular unit pieces according to the present invention substantially coincide with the cutters of the cutting frame or the array structure of the cutters. Consequently, it is interpreted that the array structure of the rectangular unit pieces means the cutters or the array structure of the cutters, so long as an additional description is not given.

In a preferred example, the cutting frame may include two or more first cutters sequentially arranged while being adjacent to each other in the longitudinal direction of the base material sheet and two or more second cutters sequentially arranged while being adjacent to each other in the longitudinal direction of the base material sheet.

In addition, the first cutters and the second cutters may have the same array length. Furthermore, the first cutters and the second cutters may be arranged adjacent to each other such that the first cutters and the second cutters are spaced apart from each other by a distance corresponding to a cutting margin.

Consequently, the cutting frame including the above structure may continuously cut a plurality of one or more kinds of rectangular unit pieces with the result that the remaining portion after cutting can be utilized.

Furthermore, in the cutting frame according to the present invention, two kinds of rectangular unit pieces having different optical directivities may be arranged on the same base material sheet to utilize the remaining portion after cutting, thereby reducing cutting loss and thus lowering manufacturing costs of products.

In accordance with another aspect of the present invention, there is provided rectangular unit pieces manufactured using the method of manufacturing the rectangular unit pieces as described above.

In accordance with a further aspect of the present invention, there is provided an optical device including the rectangular unit pieces with the above-stated construction as an optical part. The optical device may include a first unit piece and a second unit piece, the first unit piece and a second unit piece being arranged such that optical directivities of the first unit piece and the second unit piece are perpendicular to each other. Specifically, the optical device may be, but is not limited to, a liquid crystal display (LCD), an organic light emitting diode (OLED), an LCD television (TV), a light emitting diode (LED) TV, an LCD monitor, an LED monitor, or a display device.

The structure of the optical device and a manufacturing method thereof are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 1:
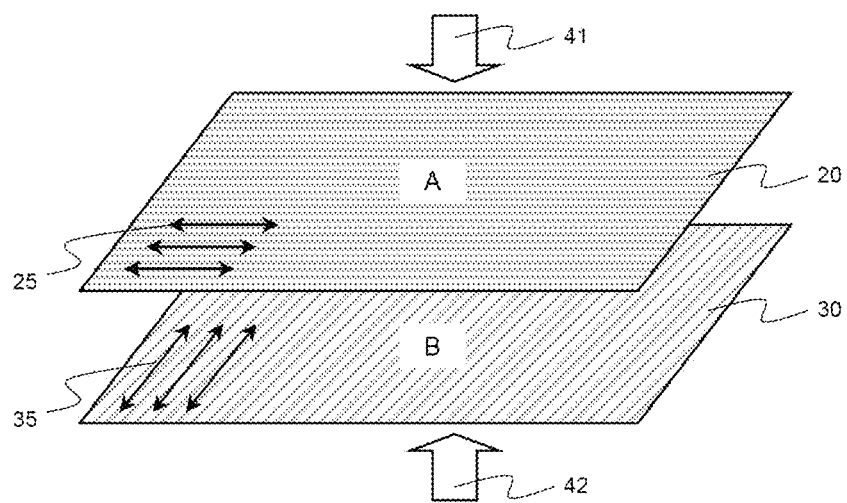
FIG. 1 is a typical view showing that rectangular unit pieces, manufactured using a conventional cutting frame, are applied to a real product.
Figure 2:
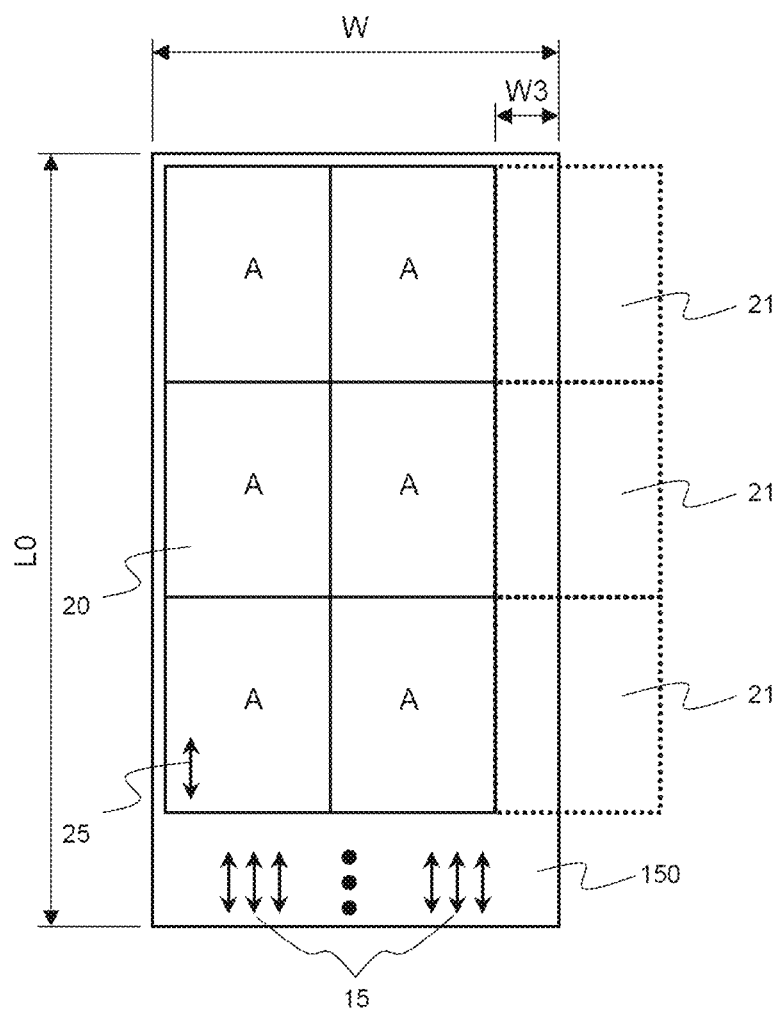
FIGS. 2 and 3 are partial typical views showing the array structure of rectangular unit pieces corresponding to cutters of the conventional cutting frame.
Figure 3:
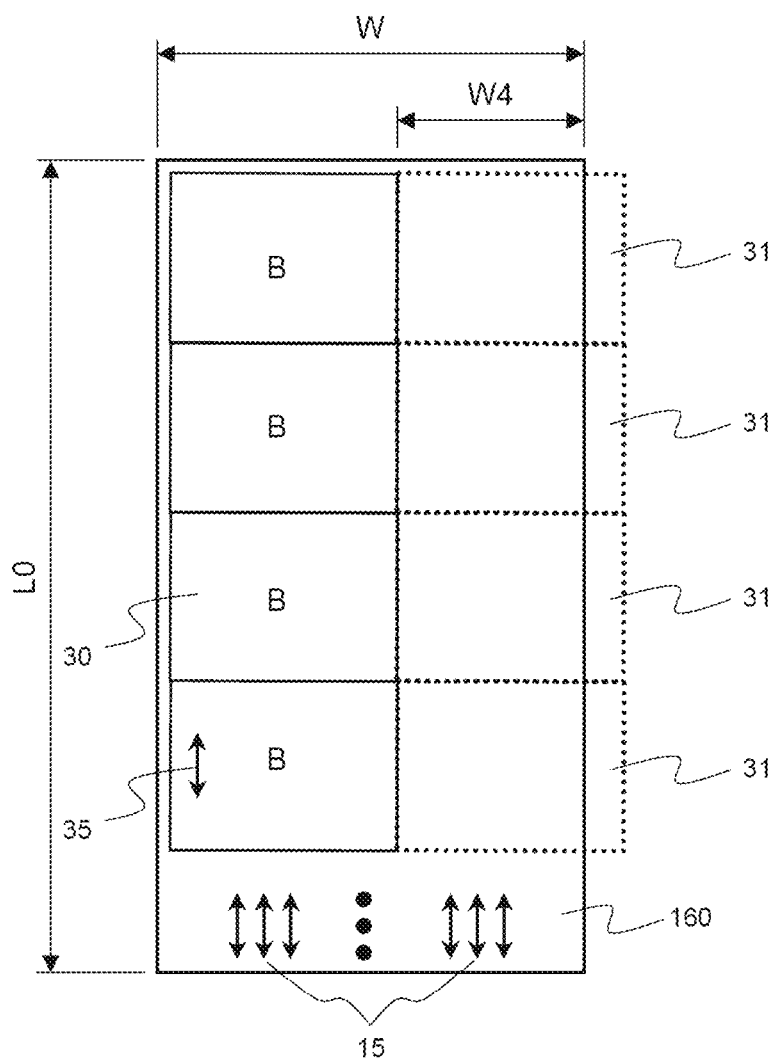
Figure 4:
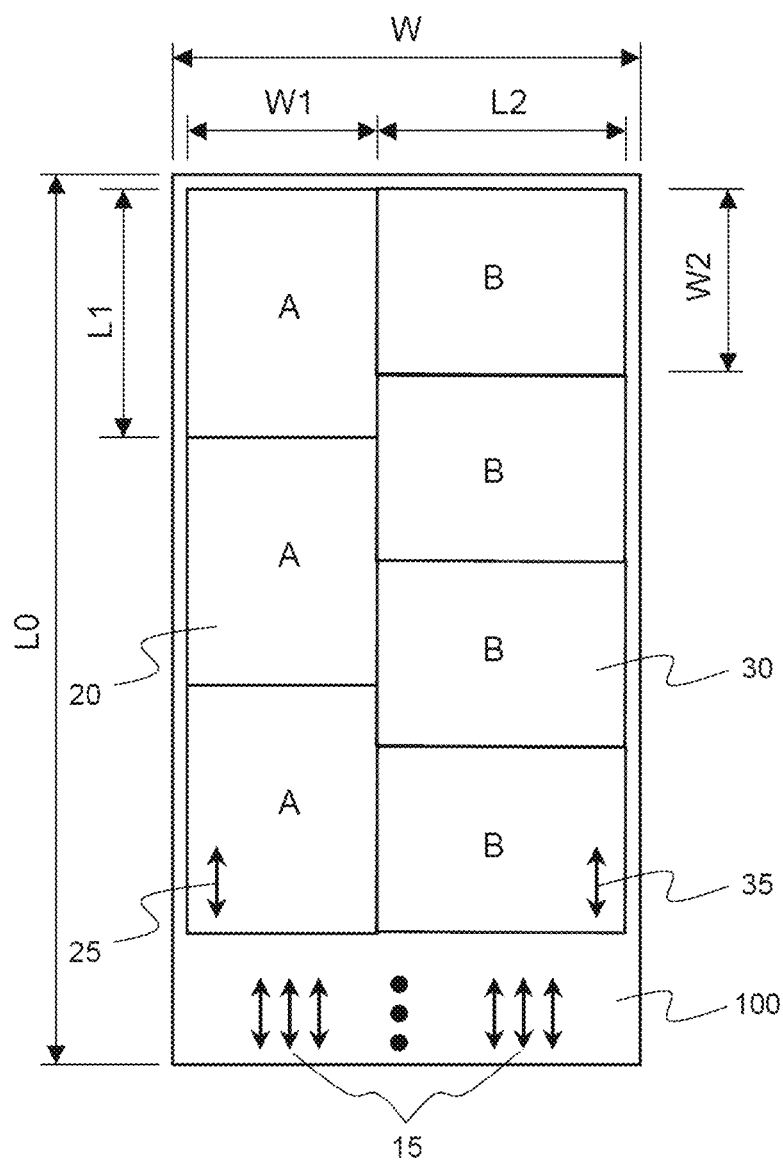
FIG. 4 is a partial typical view showing the array structure of rectangular unit pieces corresponding to cutters of a cutting frame according to an embodiment of the present invention.
Figure 5:
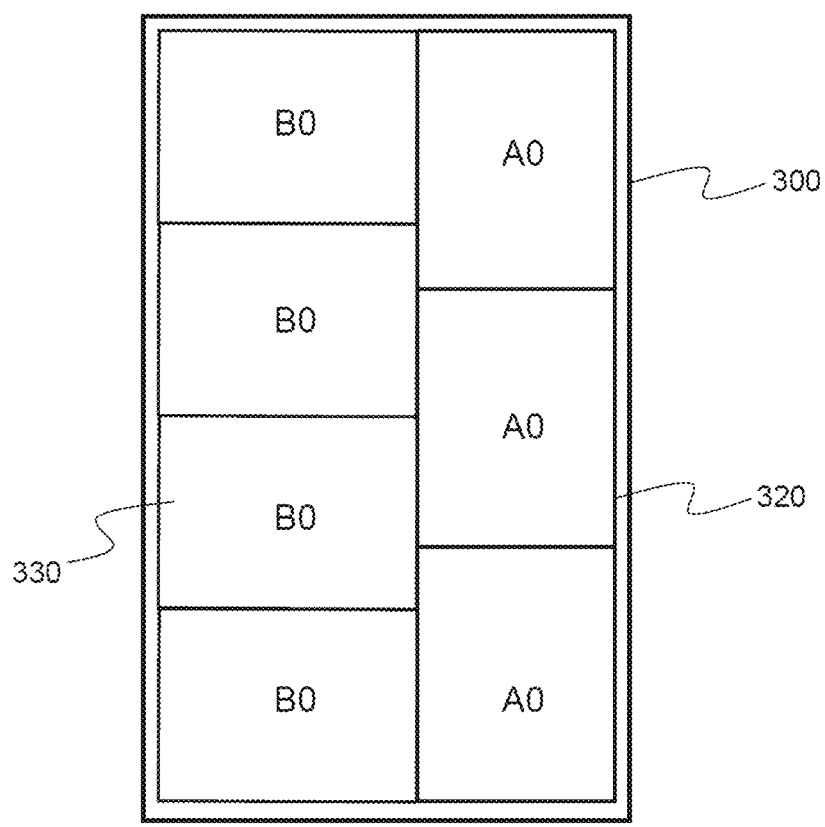
FIG. 5 is a typical view showing that the cutters are formed in the cutting frame according to the embodiment of the present invention.

FIG. 4 is a partial typical view showing the array structure of rectangular unit pieces corresponding to cutters of a cutting frame according to an embodiment of the present invention. In addition, FIG. 5 is a typical view showing that the cutters are formed in the cutting frame according to the embodiment of the present invention.

Referring to these drawings, a plurality of cutters 320 and 330 is mounted or formed in a cutting frame 300. The cutters 320 and 330 cut a base material sheet 100 according to the array shape of the cutters 320 and 330 to manufacture rectangular unit pieces 20 and 30.

The array length of the first cutters 320 is equal to that of the second cutters 330 such that the shape of the upper end of each of the cutters 320 and 330 is identical to that of the lower end of each of the cutters 320 and 330.

Consequently, it is possible to continuously manufacture the rectangular unit pieces 20 and 30 using the cutting frame 300 without an unnecessary cutting margin. As a result, it is possible to improve cutting efficiency and thus to lower manufacturing costs of the rectangular unit pieces.

In addition, the first cutters 320 are arranged to be parallel to optical directivity 15 of the base material sheet 100 and the second cutters 330 are arranged to be perpendicular to the optical directivity 15 of the base material sheet 100.

Consequently, it is possible to cut rectangular unit pieces 20 and 30 having different optical directivities from the same base material sheet 100 using the cutting frame 300.

Specifically, the first cutters for cutting first unit pieces having optical directivity parallel to that of the base material sheet and the second cutters for cutting second unit pieces having optical directivity perpendicular to that of the base material sheet are mounted in the cutting frame 300 according to the present invention, thereby achieving high cutting efficiency.

In addition, it is possible to manufacture the rectangular unit pieces base on the array structure of the rectangular unit pieces having high cutting efficiency, thereby reducing cutting loss and thus lowering manufacturing costs of products.

Figure 6:
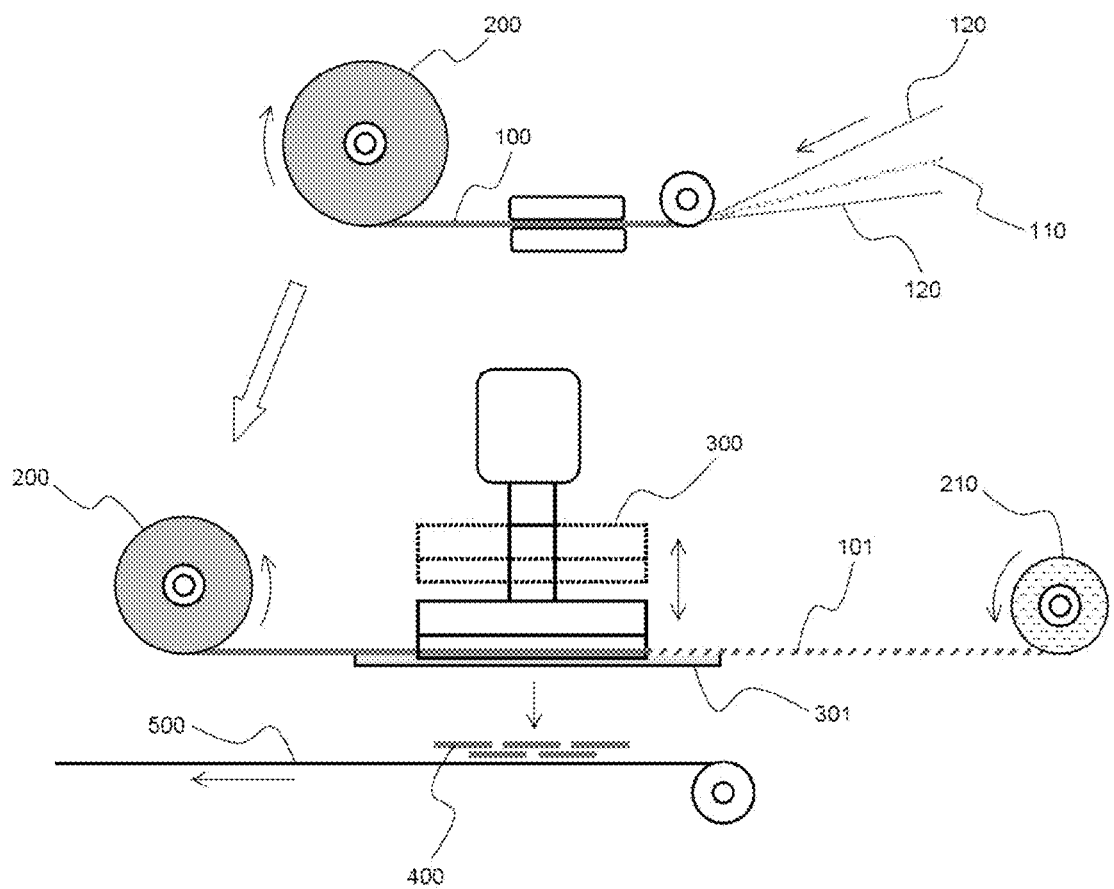
FIG. 6 is a view showing a series of steps of a method of manufacturing rectangular unit pieces according to an embodiment of the present invention.

FIG. 6 is a view showing a series of steps of a method of manufacturing rectangular unit pieces according to an embodiment of the present invention.

Referring to FIG. 5 together with FIG. 5, rectangular unit pieces 400 are manufactured through a step of manufacturing a base material sheet 100 of a laminate sheet structure and winding the base material sheet 100 on a supply roll 200, a step of continuously supplying the base material sheet 100 from the supply roll 200, a step of cutting the base material sheet 100 using the cutting frame 300 to obtain a plurality of rectangular unit pieces 400, a step of winding scrap 101 produced after the cutting of the base material sheet 100 on a winding roll 210, and a step of transferring the rectangular unit pieces 400 to a predetermined position.

The base material sheet 100 is configured to have a laminate structure in which protective sheets 120 are bonded to opposite sides of a sheet 110 including a predetermined absorption layer or transmission layer.

The base material sheet 100, supplied from the supply roll 200, is maintained in a continuous sheet shape even after the base material sheet 100 is cut by the cutting frame 300. Consequently, the base material sheet 100 can be continuously wound on the winding roll 210 in the shape of scrap 101 produced after the cutting of the base material sheet 100, thereby continuously performing the operation. Specifically, during the cutting operation using the cutting frame 300, the operation is continuously performed through intermittent stop processes since the base material sheet 100 does not move.

When the base material sheet 100 is transferred onto a die 301, the cutting frame 300 is lowered and the cutters 320 and 330 cut the base material sheet 100. The rectangular unit pieces 400, dropped under the die 301, are transferred to a predetermined position along a conveyor 500.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Effects of the Invention

As is apparent from the above description, a method of manufacturing rectangular unit pieces according to the present invention has effects in that first cutters for cutting first unit pieces having optical directivity parallel to that of a base material sheet and second cutters for cutting second unit pieces having optical directivity perpendicular to that of the base material sheet are mounted in a cutting frame, thereby achieving high cutting efficiency. In addition, it is possible to manufacture the rectangular unit pieces based on the array structure of the rectangular unit pieces having high cutting efficiency as described above, thereby reducing cutting loss and thus lowering manufacturing costs of products.

The invention claimed is:

1. A method of manufacturing two kinds of rectangular unit pieces having different optical properties from a base material sheet through cutting using a cutting frame comprising a cutter, the method comprising:

preparing a base material sheet having a large length to width ratio, the base material sheet exhibiting one optical directivity in a longitudinal direction or in a lateral direction;

preparing a cutting frame comprising at least one first cutter for cutting a first unit piece exhibiting optical directivity parallel to that of the base material sheet and at least one second cutter for cutting a second unit piece exhibiting optical directivity perpendicular to that of the base material sheet, the first cutter and the second cutter being arranged adjacent to each other in the lateral direction of the base material sheet; and sequentially cutting the base material sheet using the cutting frame in the longitudinal direction of the base material sheet to simultaneously manufacture the first unit piece and the second unit piece, wherein the cutting frame comprises two or more first cutters sequentially arranged while being adjacent to each other in the longitudinal direction of the base material sheet and two or more second cutters sequentially arranged while being adjacent to each other in the longitudinal direction of the base material sheet, sides of the first cutters adjacent to each other are coincided and sides of the second cutters adjacent to each other are coincided, the first cutters and the second cutters have the same array length, and the first unit piece and the second unit piece have the same length and width when the first unit piece and the second unit piece are arranged such that the optical directivities of the first unit piece and the second unit piece are perpendicular to each other.

2. The method according to claim 1, wherein the base material sheet is a laminate sheet comprising a selective absorption/transmission layer comprising a layer for absorbing or transmitting only a specific-direction wave motion of light or an electromagnetic wave in the longitudinal direction or in the lateral direction.

3. The method according to claim 2, wherein the laminate sheet is manufactured by coupling separately manufactured unit sheets by adhesive or thermal welding or by co-extrusion.

4. The method according to claim 1, wherein each cutter of the cutting frame is a knife for cutting or a light source for cutting.

5. The method according to claim 4, wherein the knife for cutting is a metal knife or a jet water knife, and the light source for cutting is laser.

6. The method according to claim 4, wherein the knife for cutting is mounted or formed in the cutting frame while having a shape corresponding to each rectangular unit piece.

7. The method according to claim 1, wherein the first cutters and the second cutters are arranged adjacent to each other such that the first cutters and the second cutters are spaced apart from each other by a distance corresponding to a cutting margin.

8. Rectangular unit pieces manufactured using a method according to claim 1.

9. An optical device comprising rectangular unit pieces according to claim 8 as an optical part.

10. The optical device according to claim 9, wherein the optical device comprises a first unit piece and a second unit piece, the first unit piece and a second unit piece being arranged such that optical directivities of the first unit piece and the second unit piece are perpendicular to each other.

11. The optical device according to claim 9, wherein the optical device is a liquid crystal display (LCD), an organic light emitting diode (OLED), an LCD television (TV), a light emitting diode (LED) TV, an LCD monitor, an LED monitor, or a display device.

* * * * *